J. F. THOMAS.
Pitman.
No. 166,039. Patented July 27, 1875.
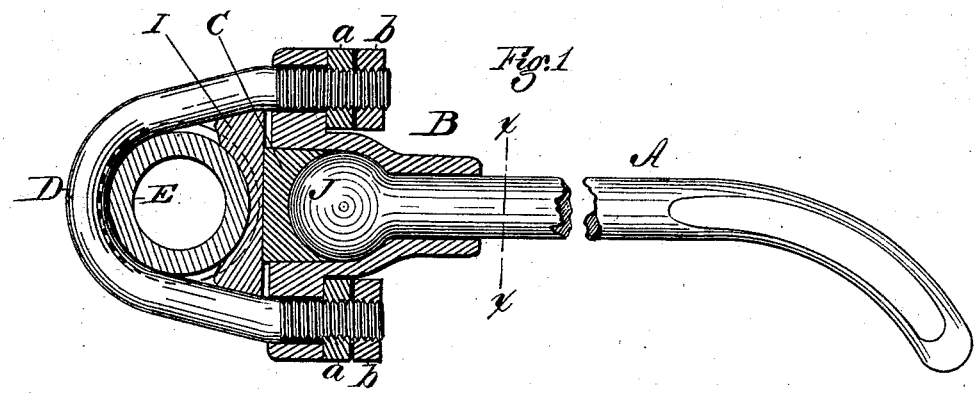
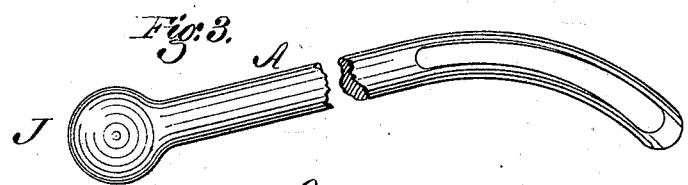
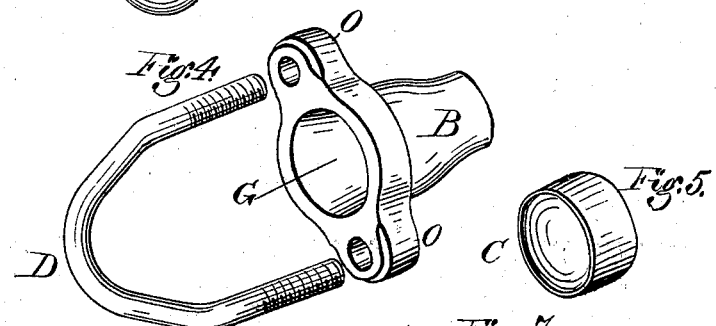
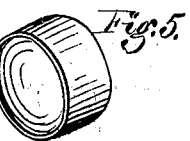
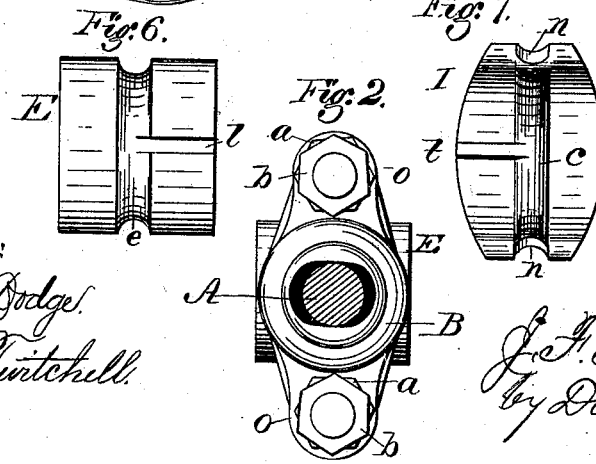
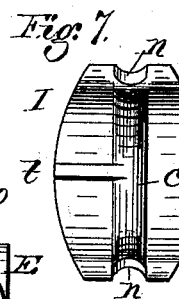
Witnesses:
Will W. Dodge.
Donn Twitchell.
Inventor:
J. F. Thomas
by Dodge & Son
Attys.

UNITED STATES PATENT OFFICE.

JOHN F. THOMAS, OF ILION, NEW YORK.

IMPROVEMENT IN PITMEN.

Specification forming part of Letters Patent No. 166,039, dated July 27, 1875; application filed May 28, 1875.

*To all whom it may concern:*

Be it known that I, JOHN F. THOMAS, of Ilion, in the county of Herkimer and State of New York, have invented certain Improvements in Pitman Heads or Connections, of which the following is a specification:

My invention relates to pitmen for mowing-machines and similar implements; and the invention consists in a novel construction and combination of parts, whereby a slight lateral play is given to the rod to allow it to adjust itself and prevent binding, and also enable the wear of the joint to be taken up, all as hereinafter more fully described.

Figure 1 is a side elevation, with the parts shown partly in section. Fig. 2 is a transverse section on the line $x\ x$ of Fig. 1; and Figs. 3, 4, 5, 6, and 7 are views of the several parts detached.

In constructing my improved apparatus I make the pitman A of any desired form and size, with a spherical head, J, as shown in Fig. 3, this head or the entire rod being preferably made of steel, and so finished as to have a true spherical surface. I then provide a yoke, B, which has an internal recess, G, the bottom of which is also made spherical, and of a size corresponding to that of the head J, as shown in Figs. 1 and 4. This yoke B has two laterally-projecting perforated ears, $o$, and also a tubular neck, through which the rod A projects, as shown. The orifice extending through this neck is made of an oval form, as shown in Fig. 2, by which means the rod A is permitted to have a little lateral play or movement, by which it can adjust itself whenever the position of the sickle is changed in relation to the wrist-pin of the driving-wheel, this change of position occurring whenever the cutting apparatus is raised or lowered, as is frequently necessary, in order to cut at different heights. By this means a reciprocating cutter or other device may be used, even when a little out of line with the driving-crank or wrist-pin, without binding in its bearings, a very important consideration, especially in reapers and mowers, which, being exposed to the elements, are very apt to become warped, or out of true, as termed by mechanics.

To hold the spherical head J in its seat in the chamber G of the yoke, I provide a plug, C, which has one end made concave to fit against the head, as shown in Fig. 1, the plug being shown detached in Fig. 5. This plug is held in place by a shoe, I, shown detached in Fig. 7. This shoe is provided on its ends with concavities or notches $n$, in which the arms of staple or loop D engage, as shown in Fig. 1, by which it is held securely in place. It is also made concave on its opposite face to fit the surface of the tubular box E, which fits upon the wrist-pin when applied to the machine.

In order to lock the box E and the shoe I rigidly together, so as to hold the box firmly in position, the shoe is provided on its concave surface with a central longitudinal projection or rib, $c$, and a lateral rib, $t$, as shown in Fig. 7, these projections fitting into corresponding grooves or recesses $e\ l$ on the exterior of box E, as shown in Fig. 6, so that when they are united and embraced by the staple D, in the manner shown in Fig. 1, it will be seen that box E is firmly secured, and cannot turn or get out of line.

Instead of this construction, it is obvious that the box E and the shoe I may be cast or formed together in one piece, if preferred.

By making the bearing or joint spherical I obtain the largest possible bearing and wearing surface with the least possible amount of metal, and by making the plug C to project a little beyond the face of the yoke B, as shown in Fig. 1, or by inserting washers or packing between it and the shoe, the plug can at any time be set up to compensate for the wear of the parts by simply tightening up the nuts $a$, there being also jam-nuts $b$ to prevent the nuts $a$ from working loose.

By these means I produce a flexible pitman or connecting-rod that is especially adapted for use on harvesters and mowers, and which can also be advantageously used in many other styles of machinery.

Having thus described my invention, what I claim is—

The combination, in a pitman-head, of the yoke B, spherical head J, plug C, with the box E, shoe I, and staple D, all constructed and arranged to operate substantially as set forth.

JOHN F. THOMAS.

Witnesses:
A. M. ROSS,
G. R. BASSETT.